United States Patent

Kuszaj

[15] 3,673,816

[45] July 4, 1972

[54] COUPLING ARRANGEMENT

[72] Inventor: Alex Mark Kuszaj, Irwin, Pa.

[73] Assignee: Jones & Laughlin Steel Corporation, Pittsburgh, Pa.

[22] Filed: March 5, 1971

[21] Appl. No.: 121,282

[52] U.S. Cl. ................................................................. 64/23
[51] Int. Cl. .......................................................... F16d 3/06
[58] Field of Search ............................... 64/23, 23.5, 30, 8, 1

[56] References Cited

UNITED STATES PATENTS

| | | | |
|---|---|---|---|
| 2,259,460 | 10/1941 | Dexter | 64/23.5 |
| 2,833,183 | 5/1958 | Zierden | 64/8 X |

*Primary Examiner*—Edward G. Favors
*Attorney*—T. A. Zalenski and G. R. Harris

[57] ABSTRACT

A coupling arrangement for connecting a driving member to a driven member to transfer driving torque to the latter employs opposing wedge elements to lock the members together. The wedge elements function to provide large static clearances between the coupling arrangement and driven member upon their engagement and disengagement, enabling the driven member to be readily changed. At the same time, the wedge elements function to automatically take up the static clearance upon insertion of the driven member into the coupling arrangement, and, in addition, automatically compensate for dynamic clearances occurring during operation of the driven member.

5 Claims, 3 Drawing Figures

PATENTED JUL 4 1972 3,673,816

INVENTOR
ALEX M. KUSZAJ

COUPLING ARRANGEMENT

The present invention relates to a coupling arrangement and, more particularly, to a coupling arrangement for a rotational drive system, such as a rolling mill drive assembly.

Rotational drive systems of various kinds employ coupling arrangements for connecting the driving mechanism to a driven member. For example, typically, in rolling mills used in the steel industry, one end of a driven roll is connected by means of a coupling to a spindle which is associated with the gear drive or motor that provides the driving torque. The neck of the driven roll has two diametrically opposed flat surfaces which engage complementary flat surfaces in a socket in the coupling when the neck is inserted therein, and the driving torque is transmitted through these engaging surfaces. It is, of course, necessary to provide sufficient clearance (which I refer to as static clearance) between the roll neck and coupling socket to insure that the roll neck can be readily inserted into and withdrawn from the coupling for ease of changing the roll.

Various means, either automatic or manual, have been used to bring the roll neck and coupling into tight engagement at their flat surfaces. However, except for one coupling arrangement of which I am aware, existing static clearance take-up mechanisms do not automatically compensate for dynamic clearances caused by axial shifting of the roll during rolling and clearances brought about by wear at the areas of engagement between the roll neck and coupling. As a result, the amount of backlash may increase in the drive systems during operation, and stresses are established in them reducing their effective capacities.

The one coupling arrangement of which I am aware which does compensate for dynamic clearances and clearances caused by wear is not entirely satisfactory because it requires axial movement between the gear teeth which are used to transmit the driving torque, causing undue wear of the gear teeth, and because the arrangement requires the relatively high inertia of the coupling sleeve to follow axial movements of the driven roll.

The present invention provides a coupling arrangement which provides large static clearances in the coupling sleeve connecting a driven roll to a drive system, enabling the roll neck to be readily inserted into the sleeve, while at the same time providing automatic take-up of the static clearances and automatic compensation for dynamic clearances, which occur during rolling operations, and wear. At the same time the invention does not suffer from those disadvantages present in the known coupling arrangement mentioned above.

More particularly, the present invention provides a coupling arrangement which includes a coupling sleeve adapted at one end to be connected to the driving member of a drive system and having at its other end a socket for receiving the roll neck of a driven roll. Preferably, the socket has two diametrically opposed driving surfaces on which respective pairs of superimposed wedge elements are slidably mounted. One wedge element of each pair, referred to as an outer wedge element, is in direct sliding contact with a respective one of the driving surfaces. The outer wedge elements taper down from the inside to the outside of the socket and are continually urged outwardly of the socket by a compression spring. The other wedge element of each pair of wedge elements, referred to as an inner wedge element, is in direct sliding contact with its pair-mate. The inner wedge elements taper down from the outside to the inside of the socket and also are continually urged outwardly of the socket by a compression spring.

The urging of the wedge elements outwardly places them in a position providing the necessary entry clearance for insertion of the roll neck into the socket. Each of the inner wedge elements includes means which extends outside the socket and engages the shoulder of the roll as the roll neck is first inserted into the socket. Continued insertion of the roll neck drives the inner wedge elements inwardly of the socket against their associated compression springs, taking up the static clearance. Further movement of the roll neck into the socket causes the inner and outer wedge elements to move inwardly of the socket as a unit. Dynamic clearances created by axial movement of the roll neck during rolling and clearances created by wear of the roll neck are automatically compensated for by the motion interaction of the opposing wedge elements. When the roll is to be removed from the coupling, it is simply withdrawn from the coupling sleeve socket and the wedge elements are moved to their extended positions under the influence of their associated compression springs.

Various other features, objects, and advantages of the present invention will be better understood from the following detailed description thereof read in conjunction with the accompanying drawings in which.

Figure 1:
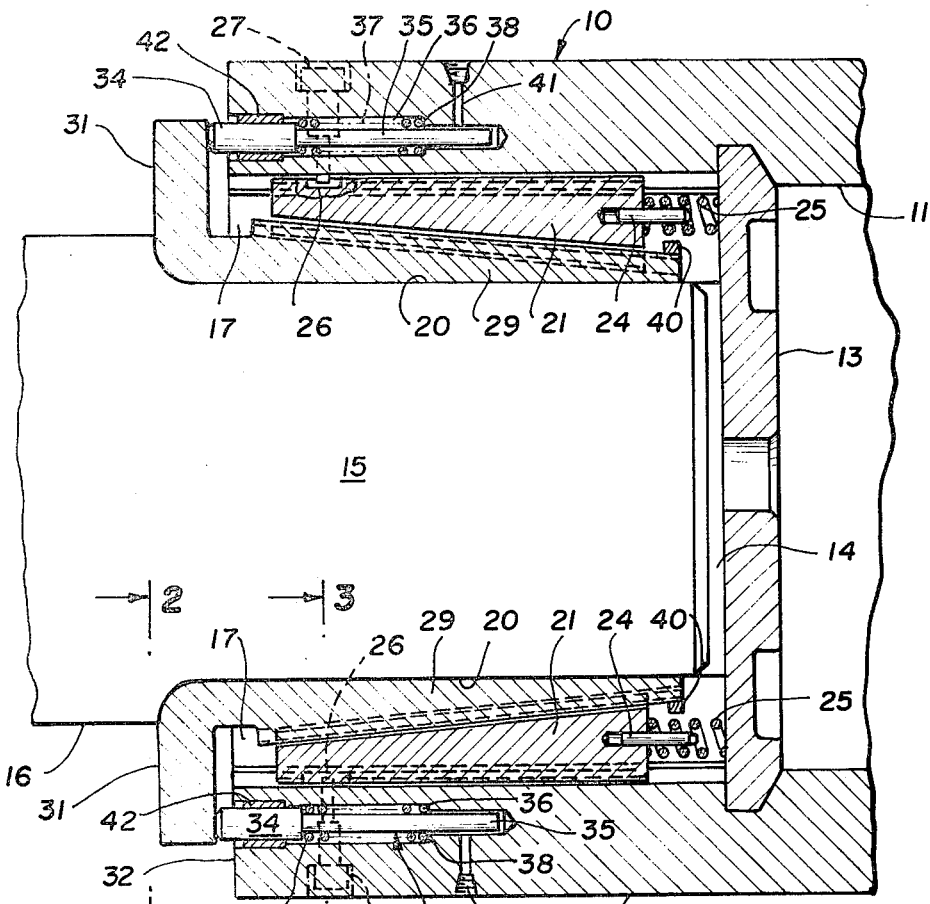
FIG. 1 is a cross-sectional view of an embodiment of the coupling arrangement of the invention presently preferred by me, showing the coupling arrangement engaging the neck of a rolling mill roll.
Figure 2:
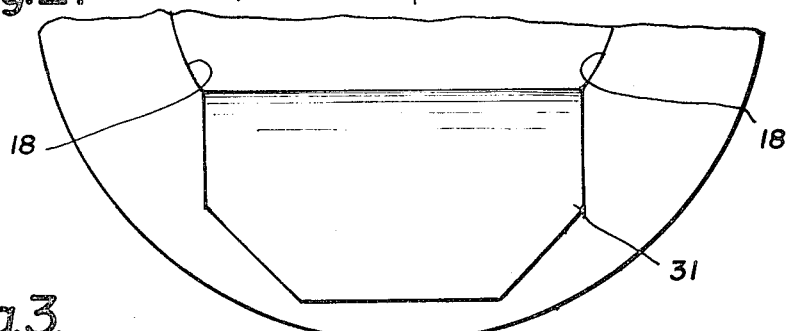
FIG. 2 is a cross-sectional view taken on the line 2—2 of FIG. 1 with the roll neck removed from the coupling arrangement.
Figure 3:
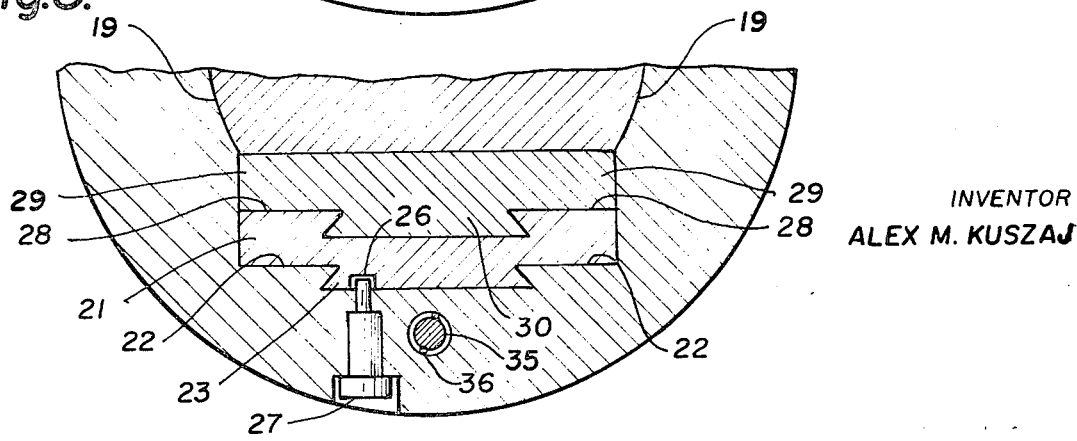
FIG. 3 is a cross-sectional view taken on lines 3—3 of FIG. 1.

The coupling arrangement of the present invention includes a coupling sleeve 10 having an internally mounted plate 13 which separates the sleeve into two sections, a back end 11 and front end 12. Back end 11 is adapted to be connected to a drive spindle of a rolling mill drive system, not shown. Front end 12 of the coupling is provided with a socket 14 for receiving the roll neck 15 of a rolling-mill roll 16.

The bottom of socket 14 is formed by plate 13 while its lateral dimensions are defined by diametrically opposed cylindrical surfaces 18—18 and recesses 17—17 which extend the entire length of the socket parallel to the longitudinal axes of the coupling sleeve 10 and roll 16. Roll neck 15 is provided with diametrically opposed cylindrical surfaces 19—19 and flat surfaces 20—20 and is positioned within socket 13 so that its cylindrical surfaces are opposite cylindrical surfaces 18—18 while its flat surfaces 20—20 are opposite recesses 17—17.

The coupling arrangement of the invention further includes two pairs of superimposed wedge elements mounted within recesses 17—17 for sliding movement therealong inwardly and outwardly of socket 14. Outer wedge elements 21—21 are in direct sliding contact with respective opposed flat surfaces 22—22 within the recesses and are keyed to the socket wall by means of respective dovetail connections 23—23. The outer wedge elements 21—21 taper outwardly of socket 14 and have mounted at their inner ends rods 24—24. Relatively stiff compression springs 25—25 are supported about rods 24—24 and bear on the backs of the respective outer wedge elements and the plate 13 to continually urge the outer wedge elements outwardly of socket 14.

Slots 26—26 extending longitudinally of the socket axis are provided in outer wedge elements 21—21 and receive the ends of respective stop elements 27—27 which extend through the wall of the coupling sleeve and are secured thereto by screw-thread connections. The stop elements, of course, limit movement of the outer wedge elements inwardly and outwardly of the socket. The longitudinal extent of each slot is such as to permit the outer wedge elements sufficient longitudinal movement to accomplish the coupling objectives of the invention.

Superimposed on outer wedge elements 21—21 and in sliding contact therewith along respective opposed surfaces 28—28 are inner wedge elements 29—29. The inner wedge elements are keyed to the outer wedge elements 21—21 by means of respective dovetail connections 30—30. The inner wedge elements 29—29 taper inwardly of socket 14 and include as an integral part thereof flanges 31—31 which partially extend out over the end 32 of the coupling sleeve wall.

Rod members 33—33 having cylindrical heads or foreparts 34—34 and cylindrical backparts 35—35 of a smaller diameter are positioned within longitudinally extending recesses 36—36 in the wall of the coupling sleeve 10. Compression springs 37—37 of a stiffness less than springs 25—25 are supported about the backparts 35—35 of rod members 33—33 and bear against the back of heads 34—34 and shoulders 38—38 provided in recesses 36—36 to maintain the heads in engagement with flanges 31—31 of respective inner wedge elements 29—29 to continually urge the latter outwardly of the socket 14. The inner wedge elements 29—29 are provided at their respective ends which are adjacent the bottom of socket 14 with projections 40—40 which extend over the back ends of respective outer wedge elements 21—21 and which act as stop means to limit the relative movement between the inner and outer wedge elements outwardly of the socket.

Ports 41—41 are provided in the wall of the coupling sleeve to provide a means of fluid communication between recesses 36—36 and a hydraulic means, not shown, attached to the sleeve at the ports. To assist in freeing the wedge elements from the roll neck when the roll is to be removed, hydraulic fluid can be delivered to recesses 36—36 to drive rod members 33—33 outwardly of their respective recesses and, consequently, inner wedge elements 27—27 outwardly of socket 14.

Sealing means 42—42 are provided within respective recesses 36—36 in the region where heads 34—34 are located to seal off hydraulic oil flow from the recesses.

The inner and outer wedge elements are constructed by proper selection of materials and geometry so that when they are clamped in tight metal to metal contact, the coefficient of friction existing at the interface between each inner and outer wedge element is greater than either the coefficient of friction at the interface between each outer wedge element and the surfaces 22—22 along which they slide or the coefficient of friction at the interface between each inner wedge element and the flat surfaces 20—20 of the roll neck.

From the foregoing description, it will be understood that when the coupling arrangement of the invention is in a position to receive the roll neck, the inner and outer wedges are in extended positions providing adequate static clearance for insertion of the roll neck into the coupling socket. As the roll neck is inserted into the socket, the shoulder of roll 16 engages flanges 31—31 of the inner wedge elements 29—29 driving them inwardly of socket 14 over the outer wedge elements 21—21 against the forcing action of compression springs 37—37 to take up the static clearance and bring the roll neck and coupling sleeve into tight metal to metal contact. Further movement of the roll neck into the coupling socket causes each inner and outer wedge element pair to move as a unit against the forcing action of the compression springs 25—25 and 37—37 because of relationships among the coefficients of friction at the various sliding interfaces as described above. Dynamic clearances established as a result of axial movement of roll 14 and clearances created as a result of wear are automatically compensated for by motion interaction of the pairs of superimposed wedge elements.

When it is desired to remove the roll, it is simply withdrawn from the coupling with or without the assistance of supplying hydraulic fluid to recesses 36—36, driving rod members 33—33 and, consequently, wedge elements 29—29 outwardly of socket 14. When the roll is withdrawn, the wedge elements return to their extended positions.

I claim:
1. A coupling arrangement for connecting a driving means to a driven means comprising:
   a. a coupling sleeve adapted at one end to be engaged by said driving means and having at the other end a socket for receiving a portion of the driven member,
   b. an outer wedge element slidably mounted along a surface within said socket for longitudinal movement inwardly and outwardly of said socket,
   c. means for continually urging said first wedge element outwardly of said socket,
   d. an inner wedge element slidably mounted on said outer wedge element for axial movement inwardly and outwardly of said socket, independently of and together with said outer wedge element, said inner wedge element having a surface for engaging a surface of the driven means,
   e. means continually urging said inner wedge element outwardly of said socket, and
   f. means as an integral part of said inner wedge element for engaging the driven means upon its insertion into said socket whereby such insertion causes said inner wedge element to be displaced inwardly of the socket against the urging of the means (e).

2. The coupling arrangement of claim 1 wherein said inner and outer wedge elements comprise a first pair of wedge elements and the coupling arrangement includes a second like pair of wedge elements positioned within said socket at a location diametrically opposite the first pair of wedge elements.

3. The coupling arrangement of claim 2 wherein the outer wedge elements taper longitudinally from the inside of the socket and said inner wedge element taper longitudinally from the outside of the socket.

4. The coupling arrangement of claim 1 wherein means (c) comprises a compression spring which at one of its ends bears on the end of the outer wedge element innermost of the socket and at the other of its ends bears on a plate member forming the bottom of the socket, and means (e) comprises a rod member having a cylindrically shaped forepart and a cylindrically shaped back part of a smaller diameter than its forepart and being mounted for reciprocating motion within a recess in the wall of the sleeve coupling, the front of said forepart bearing against means (f), a second compression spring supported about the back part of said rod and bearing at one of its ends against the back of the forepart of said rod and at the other of its ends against the bottom of said recess.

5. The coupling arrangement of claim 4 in which the outer wedge element is slidably secured to the coupling sleeve and the inner wedge element is slidably secured to the outer wedge element by respective dovetail connections, and including stop means for limiting the longitudinal movement of the wedge elements inwardly and outwardly of the socket.

* * * * *